Sept. 5, 1961  R. I. MASON  2,998,790
NAVIGABLE SURFACE CRAFT
Filed April 1, 1958  2 Sheets-Sheet 1
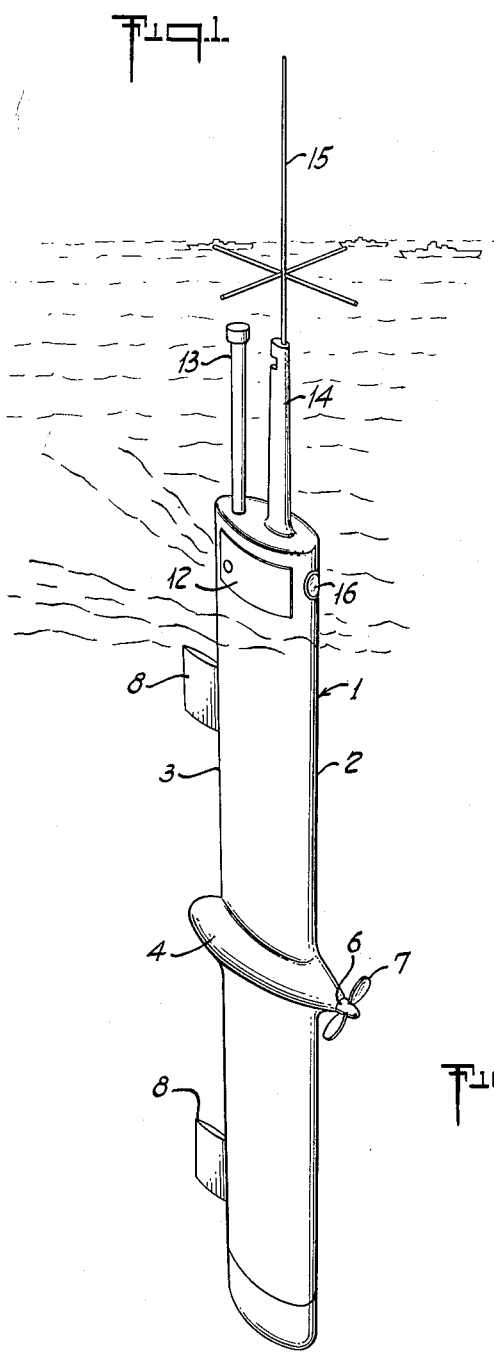
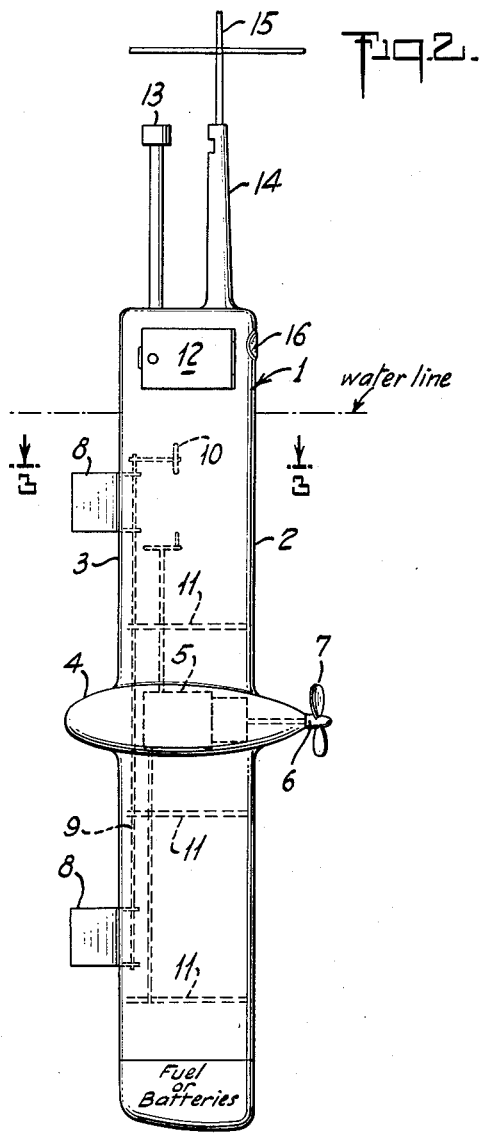
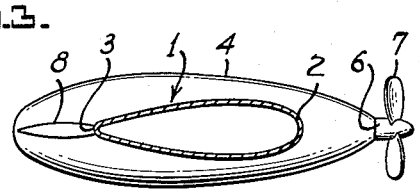
INVENTOR
RUSSELL I. MASON
BY
ATTORNEY Sept. 5, 1961 R. I. MASON 2,998,790
NAVIGABLE SURFACE CRAFT
Filed April 1, 1958 2 Sheets-Sheet 2
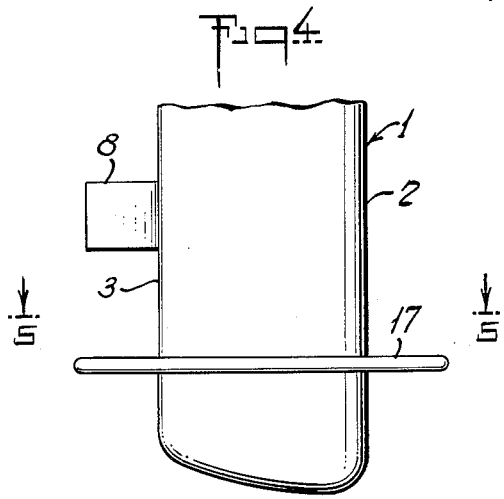
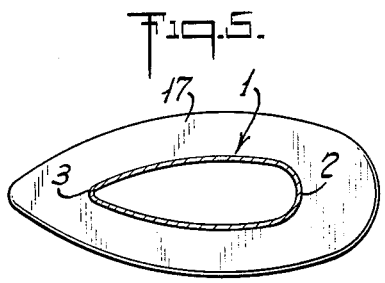
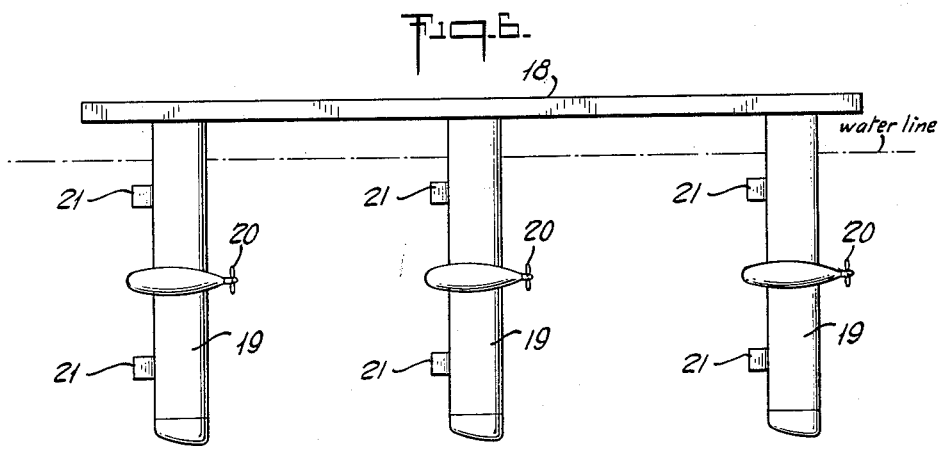
INVENTOR
RUSSELL I. MASON
BY
Lee D. Humberger
ATTORNEY

United States Patent Office 2,998,790
Patented Sept. 5, 1961

2,998,790
NAVIGABLE SURFACE CRAFT
Russell I. Mason, Mappa Ave., Barneveld, N.Y.
Filed Apr. 1, 1958, Ser. No. 725,766
18 Claims. (Cl. 114—61)
(Granted under Title 35, U.S. Code (1952), sec. 266)

The invention described herein may be manufactured and used by or for the Government of the United States of America for governmental purposes without the payment of any royalties thereon or therefor.

This invention relates to surface craft, and particularly to navigable surface craft. All boats or water craft which are designed for motion, whether by power or sail, have heretofore been built as horizontal craft that are greater in length than in beam and draft. They have, with the exception of submarines, been designed to obtain buoyancy at the surface of a body of water. Even submarines to date have really been only submersible surface ships and employed this accepted horizontal configuration.

An object of this invention is to provide a surface craft which will have maximum inherent stability in all planes, even in rough sea conditions, which has good stability characteristics in courses with, against and across wind, which has high resistance to roll and substantial resistance to pitching, which will be relatively steady in the sea and largely unaffected by the rising and falling waves, which will be seaworthy and navigable even in rough seas, which may be operated as a robot or manned, with which surface waves will not start it oscillating in any plane, with which any vertical oscillations will be damped, which has remarkable course stability, which may be power operated, which may be easily steered or guided, and which will be relatively simple, practical, compact, and inexpensive.

Another object of the invention is to provide a catamaran craft in which a superstructure or body is supported in a relatively stable condition in a sea, irrespective of the presence or absence of rough seas, which may be self propelled and navigable, which rides in a sea rather evenly and with a minimum of pitch, roll and vertical oscillations, even in rough seas, and which is relatively simple, durable, strong, practical and inexpensive.

Other objects and advantages will be apparent from the following description of some embodiments of the invention and the novel features will be particularly pointed out hereinafter in connection with the appended claims.

In the accompanying drawings:

FIG. 1 is a schematic perspective of a surface craft constructed in accordance with this invention;

FIG. 2 is a side elevation of the same;

FIG. 3 is a transverse sectional plan of the same, the section being taken approximately along the line 3—3 of FIG. 2;

FIG. 4 is a side elevation of the lower end of such a craft, but illustrating the addition thereto of a stabilizing fin;

FIG. 5 is a transverse sectional plan of the same, the section being taken approximately along the line 5—5 of FIG. 4; and FIG. 6 is a side elevation of a catamaran craft, having its body or platform supported by hulls or craft of the type shown in FIGS. 1–5.

In the embodiment of the invention shown in FIGS. 1 to 3, the novel craft employs a hollow or shell-like hull 1 which is vertically elongated, somewhat like a spar buoy, which rides upright in the sea as shown in FIG. 1. To reduce resistance to translation movement horizontally through the sea, the hull in transverse horizontal cross section is somewhat streamlined, with one horizontal dimension much larger than the other. Its leading edge 2 at one end of the axis of the larger dimension is approximately of streamlined shape and its side edges merge into the hull sides that at their rear, or along the trailing edge 3, are somewhat closer together than at the diameter of the cylindrical surface. Intermediate of the length of that portion of the hull which rides below the water line, and preferably about midway of that portion of the hull or at the center of drag, the hull is horizontally bulged or widened in all horizontal directions, as at 4 for a small portion of the hull length to provide a larger space within the hull in which may be disposed some of the propulsion mechanism that is indicated generally and schematically by the dash lines 5 in FIG. 2. The propulsion force may be symmetrically distributed about the center of drag.

From any suitable propulsion mechanism 5, a rotatable driving shaft 6 operated thereby extends horizontally and outwardly through the leading edge 2 of the hull in the bulge 4, and there carries a propeller 7 fixed thereon. Two steering rudders 8 of the aileron type are spaced apart vertically and aligned with one another along the trailing edge 3 of the hull, one rudder being preferably disposed a selected distance above the level of the propeller 7 and the other rudder an equal distance below the propeller level, but both below the water line. These rudders are hinged to the hull to swing on vertical axes at the hulls trailing edge 3 so as to extend rearwardly from the hull. The rudders 8 are mechanically connected together for concomitant movement by a suitable coupling connection 9, and the upper rudder is operated by any suitable steering means from a wheel 10. The rudders may, if desired, be separately movable to effect trim in the same manner that ailerons are used on aircraft.

The interior of the hull is subdivided by floors 11 into a plurality of compartments arranged one above another in the hull. The lowermost compartment may contain fuel if the propelling means 5 is an engine, and batteries if the propelling means is an electric motor, or heavy equipment, as for instance, sonar. The propelling means 5 is in an intermediate compartment and partly in the bulge 4, and in the upper compartment or compartments there is space for one or more persons who operate the craft if it is manned, or the remotely controlled mechanism if it is to be controlled as a robot.

Such a hull rides low in the water with only a minor portion above the water line on the hull, and one or more closures 12 on such minor portion above the water enables access to be had to the interior of the hull for egress and ingress. Such closures 12 may be made water tight when closed, and ventilation for the interior of the hull may be obtained through an upstanding ventilator tube 13 on the closed top of the hull, which communicates with the interior of the hull. Another upstanding tube 14 on the top of the hull and communicating with the interior of the hull provides for discharge of exhaust gases if an engine is employed, and also for the support of lights and an antenna 15 which controls the operating mechanism within the hull if the craft is remotely controlled. If the craft is manned by persons, the antenna leads to radio apparatus within the hull which enables the crew to communicate with a remote base station. The leading edge of the hull, above the water line, may also carry one or more transparent windows 16 through which the crew may observe conditions outside of the hull in maneuvering the craft.

The embodiment of the invention illustrated in FIGS. 4 and 5 is the same as in FIGS. 1 to 3, inclusive except that the lower part of the hull also carries a horizontal fin 17 that may extend entirely around the hull as shown, or only for a portion of it. This fin which is provided on the lower part of the hull that rides in the relatively quiet, deep layer of the sea, tends to damp any tendency of the hull to oscillate vertically.

For superior results certain proportions of the hull have been determined. The overall vertical length of the hull is preferably at least about five times the maximum horizontal dimension of the hull, such as at least about five times the distance between the leading and trailing edges of the hull, measured at the water line. The horizontal distance between the leading and trailing edges of the hull preferably is more than about four times the other crosswise horizontal dimension at its widest point, measured at the water line. The length of the lower part of the hull within the water preferably is at least about four times the distance horizontally between the leading and trailing edges of the hull, the latter being measured at the water line. The bulge 4 in the hull is preferably about half way of the vertical length of the hull below the water line and the propeller 7 is at approximately the level of the bulge.

Since the hull is vertically long and of relatively small cross sectional dimensions, it will ride upright in the sea somewhat like a spar buoy. The major part of the hull will be in the sea well below the high and low levels of the waves, where the sea is relatively quiet and free of turbulence and vertical movements. The waves are largely in the surface layer of the sea and that part of the sea below the lower level of the waves will not be particularly agitated or turbulent, or rise and fall materially. The hull 1 should be long enough in a vertical direction, so that the lower major part of it will always be in the relatively quiet and non-turbulent part of the sea, and hence the waves, which are merely in the surface layer of the sea, will merely rise and fall along the hull and not materially change the position of the hull. There will be little or no rolling, tossing, pitching, or rising and falling of the hull. It will be the waves that move and not the hull. This stability is due to the fact that the major part of the hull is in relatively calm water of the sea.

It is also desirable that the horizontal dimensions of the hull be kept relatively small so as to reduce the effect of lateral impact of waves and wind against the hull. Because of the relatively small cross sectional dimensions of the hull, it offers minimum resistance to propulsion or drag through the sea.

In trials of such a craft it was found to be inherently stable, held well in cross-wave and cross-wind courses, the waves rode up and down the hull with a minimum of vertical movement of the hull, and the lateral impact of the waves on the relatively small area of the hull exposed to that action caused little lateral movement, roll or tilting of the hull.

In the embodiment of the invention illustrated in FIG. 6, the craft is a catamaran having a superstructure or body 18 which for convenience is shown as a platform. From this body or platform 18 depend a plurality of hulls 19, similar to hulls 1, and which are secured to the platform. These hulls 19 ride low in the water, the same as the hulls 1, and have the same proportions, with location of their centers of gravity below their centers of buoyancy, and with the major portions of the hulls in the relatively quiet or non-turbulent part of the sea. With such an arrangement, since the hulls 19 are relatively stable and unaffected by the waves, the platform or body 18 will be relatively stable and seaworthy, and could be used as a floating platform for aircraft to land on and take off from. All or part of the hulls 19 preferably have propellers 20 or other thrust producers operated by propulsion means within the related hull, and also rudders 21, so that the platform or body 18 may be moved into selected areas or otherwise maneuvered as desired.

It will be understood that various changes in the details, proportions and arrangements of parts, which have been herein described and illustrated in order to explain the nature of the invention, may be made by those skilled in the art within the principle and scope of the invention as expressed in the appended claims.

I claim:

1. A navigable surface craft having maximum stability and which is seaworthy in rough sea conditions, which comprises a buoyant, vertically elongated hull having the general shape of a spar buoy, a depth below the water line of more than four times its largest horizontal dimension and approximately streamlined in horizontal cross section for the most of its hull portion below the water line, the horizontal distance between the leading and trailing edges of said hull being more than about four times the other crosswise dimension at its widest part, propulsion means carried by said hull and having a part on its exterior and well below the minimum water line on the hull, and operable, when activated, to cause horizontal movement of the hull, steering means on said hull below the water line thereon for controlling and selectively varying the direction of horizontal travel of the hull, and means within the hull for driving said propulsion means.

2. The craft as set forth in claim 1, wherein said part of said propulsion means is located at the center of drag of the hull about halfway between the water line and the bottom of the hull.

3. The craft as set forth in claim 1, wherein said steering means includes a pair of rudders spaced apart vertically and disposed in vertical alignment and about equidistant above and below the said part of said propulsion means.

4. A navigable surface craft having a minimum of movements caused by rough seas, which comprises a buoyant, vertically elongated hull having the general shape and proportions of a spar buoy, with a depth more than four times its largest horizontal dimension, means carried by said hull for propelling it horizontally through the water and having its actuating power means within the hull and a propeller exteriorly of the hull, said propelling means being disposed well below the minimum water level on the hull determined in a rough sea, and steering means on the exterior of the hull below the water line at about midway of the draft of the hull.

5. The craft as set forth in claim 4, wherein said steering means includes a plurality of rudders spaced apart vertically on the hull with at least one at a level below the level of the propelling means.

6. The craft as set forth in claim 5, wherein said propelling means is at the leading edge of the hull to pull the hull through the water.

7. The craft as set forth in claim 5, wherein said hull at the level with the propeller is enlarged horizontally, and vertically for a small fraction of the height of the hull to accommodate said power means.

8. The craft as set forth in claim 5, and a horizontal fin carried by the hull on its lower half for damping, in the relatively quiet level of the sea, any vertical movements of the hull.

9. A catamaran surface craft having a minimum of movements caused by rough seas, which comprises a body, a plurality of individual, vertically elongated hulls secured to and depending from said body, spaced apart horizontally along and across said body and each having the general shape and proportions of a spar buoy, each hull having a depth length below the water line of more than about four times its largest horizontal dimension at the water line, and streamlined in horizontal cross section for the major part of its underwater vertical dimension.

10. The craft as set forth in claim 9, wherein the maximum horizontal dimension at the water line is more than about four times the minimum horizontal dimension of the hull at its water line.

11. A navigable surface craft having maximum stability and which is exceptionally seaworthy in rough sea conditions, which comprises a buoyant, vertically elongated hollow hull of the general shape of a spar buoy and that has a vertical dimension below the water line at least four times its maximum horizontal dimension, as measured at the water line, approximately is streamlined in horizontal cross section for most of its vertical length below the water line, said hull having an enlargement laterally for a minor part of its underwater vertical length at about midway of said underwater vertical length, a propeller element carried by the hull on its exterior at about said enlargement, power means within said enlargement part of said hull and operatively connected to said propeller element to operate the latter, and steering means secured to said hull along its trailing edge and vertically spaced from said propeller element and operable from within the hull.

12. The craft according to claim 11, wherein the portion of said hull above and below said enlargement has a horizontal distance between its leading and trailing edges exceeding about four times the width of the hull at the same location vertically.

13. A navigable surface craft having maximum stability and resistance to motion caused by waves in the water in which it floats, which comprises a buoyant, vertically elongated hull of the general shape of a spar buoy, with a vertical draft exceeding four times its maximum horizontal dimension at the water line, and with the major portion of the underwater part of the hull in the relatively quiet and non-turbulent part of said water when maximum expected waves are present, said hull being streamlined in horizontal cross section for the major part of its underwater vertical dimensions, propeller means carried by said hull on its exterior, at approximately midway of its underwater vertical dimension and having a driving part extending into the hull, means within the hull drivingly connected to said driving part for operating it, steering means on the exterior of said hull below the water line and operable from within the hull for steering the hull during motion of the hull caused by operation of said propeller means.

14. The craft according to claim 13, and an approximately horizontal fin carried by the hull on its exterior, in the part of the hull within the quiet and non-turbulent water, for resisting vertical motion of the hull under the action of waves against the upper part of the hull.

15. The craft according to claim 13 wherein said steering means comprises a rudder hinged to the hull along the upright trailing edge of the hull.

16. The craft according to claim 13, wherein said steering means comprises two rudders hinged to the hull adjacent the trailing edges of the hull one arranged above and the other below said propeller means and both equal distances from said propeller means.

17. The craft according to claim 13, wherein said hull has a lateral enlargement about midway between its lower end and the water line mounting therein said means for operating said driving part and having an upright dimension occupying a small part of its draft.

18. The craft according to claim 10, and propeller means carried by at least a plurality of said hulls on their exteriors, each at approximately midway of its underwater draft, means within each of said plurality of hulls and drivingly connected to said propeller means for operating the latter, and steering means for each of said plurality of hulls having rudders on the exteriors of said hulls and operable from within the hulls, said rudders all being below the water line of said hulls and arranged on each trailing edge of the streamlined hull, one above and one below the level of said propeller means and at about equal vertical distances from said propeller means.

References Cited in the file of this patent

UNITED STATES PATENTS

| Number | Name | Date |
|---|---|---|
| 283,091 | Farquhar | Aug. 14, 1883 |
| 998,204 | Rockman | July 18, 1911 |
| 1,048,671 | Fidler | Dec. 31, 1912 |
| 1,376,105 | Lindquist | Apr. 26, 1921 |
| 1,380,750 | Tesch | June 7, 1921 |
| 1,753,399 | Blair | Apr. 8, 1930 |
| 1,840,324 | Lindquist | Jan. 12, 1932 |
| 2,238,974 | Creed | Apr. 22, 1941 |
| 2,327,660 | Napoli | Aug. 24, 1943 |
| 2,405,115 | Creed | Aug. 6, 1946 |
| 2,519,453 | Goodman | Aug. 22, 1950 |
| 2,530,718 | Napoli | Nov. 21, 1950 |
| 2,599,163 | Costa | June 3, 1952 |

FOREIGN PATENTS

| Number | Country | Date |
|---|---|---|
| 495,713 | France | July 9, 1919 |